US010417999B2

(12) United States Patent
Lee et al.

(10) Patent No.: US 10,417,999 B2
(45) Date of Patent: Sep. 17, 2019

(54) DISPLAY DEVICE AND METHOD OF DISPLAYING IMAGE BY USING DISPLAY DEVICE

(71) Applicant: SAMSUNG DISPLAY CO., LTD., Yongin-si, Gyeonggi-Do (KR)

(72) Inventors: Jun Gyu Lee, Yongin-si (KR); Jin Woo Noh, Yongin-si (KR); Byung Ki Chun, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 126 days.

(21) Appl. No.: 15/649,741

(22) Filed: Jul. 14, 2017

(65) Prior Publication Data

US 2018/0040305 A1 Feb. 8, 2018

(30) Foreign Application Priority Data

Aug. 8, 2016 (KR) ........................ 10-2016-0100838

(51) Int. Cl.
*G09G 5/38* (2006.01)
*G02F 1/1333* (2006.01)
(Continued)

(52) U.S. Cl.
CPC .......... *G09G 5/38* (2013.01); *G02F 1/133377* (2013.01); *G09G 3/007* (2013.01); *G09G 5/003* (2013.01); *G09G 5/18* (2013.01); *G09G 5/373* (2013.01); *G09G 3/20* (2013.01); *G09G 3/2092* (2013.01); *G09G 2320/043* (2013.01); *G09G 2340/0464* (2013.01)

(58) Field of Classification Search
CPC ............ G09G 5/38; G09G 5/003; G09G 5/18; G09G 5/373; G09G 3/007; G09G 3/20; G09G 3/2092; G09G 2320/0257; G09G 2320/0252; G09G 2320/043; G09G 2320/046; G09G 2340/0464; G09G 2340/16; G02F 1/133377
USPC .......................................................... 382/149
See application file for complete search history.

(56) References Cited

U.S. PATENT DOCUMENTS 6,219,017 B1 * 4/2001 Shimada ................ G09G 3/001 345/204
2005/0275611 A1 * 12/2005 Aoki .................... G09G 3/3611 345/96

(Continued)

FOREIGN PATENT DOCUMENTS

KR 10-2016-0132170 11/2016

*Primary Examiner* — Ali Bayat
(74) *Attorney, Agent, or Firm* — F. Chau & Associates, LLC

(57) ABSTRACT

A display device and a method of operation that can reduce memory utilization during a pixel shift operation. The device includes a display panel including a first pixel and a second pixel, a processor configured to generate a first image data corresponding to the first pixel, and a first timing control signal. An image corrector is configured to generate a second image data corresponding to the second pixel based on the first image data, and shift the first timing control signal by using a positional relationship between the first pixel and the second pixel to generate a second timing control signal. A data driver is configured to generate a data signal based on the second image data and the second timing control signal.

20 Claims, 9 Drawing Sheets

(51) Int. Cl.

| | |
|---|---|
| ***G09G 5/373*** | (2006.01) |
| ***G09G 3/00*** | (2006.01) |
| ***G09G 5/00*** | (2006.01) |
| ***G09G 5/18*** | (2006.01) |
| *G09G 3/20* | (2006.01) |

(56) References Cited

U.S. PATENT DOCUMENTS

2009/0295423 A1* 12/2009 Levey .................... G09G 3/006 324/760.01
2010/0149209 A1* 6/2010 Nose .................... G09G 3/3629 345/618
2011/0080437 A1* 4/2011 Yamashita ........... G09G 3/3233 345/690
2012/0236040 A1* 9/2012 Eom ...................... G09G 3/007 345/681
2016/0329008 A1 11/2016 Chun et al.

* cited by examiner

VSYNC1
HSYNC1
DE1
DS_i
VSYNC2
HSYNC2
DE2
DS
FP
DP
BP
FPP
BPP
t1
t2
t3
t4

DISPLAY DEVICE AND METHOD OF DISPLAYING IMAGE BY USING DISPLAY DEVICE

CROSS-REFERENCE TO RELATED APPLICATIONS

This application claims priority to and the benefit of Korean Patent Application No. 10-2016-0100838, filed on Aug. 8, 2016, in the Korean Intellectual Property Office, the entire contents of which are incorporated by reference herein.

TECHNICAL FIELD

The present disclosure relates to a display device, and a method of displaying an image by using the same.

DISCUSSION OF THE RELATED ART

Various kinds of display devices, such as an organic light emitting display device, a liquid crystal display device, and a plasma display device, are in widespread use.

When the display devices output specific images or characters for a long time, a performance of specific pixels can become degraded, thereby generating an afterimage.

Pixel shift technology has been developed to reduce the occurrence of afterimages on display devices. In pixel shift technology, the display of a stationary image is periodically moved (shifted) along the display panel. When the display device shifts an image at a predetermined period and displays the shifted image on a display panel, a specific pixel may not display the same data for a relatively long time, which reduces the possibility of pixel degradation.

SUMMARY

The present inventive concept provides a display device, which is capable of decreasing a usage of a line memory storing image data for performing a pixel shift operation, and a method of displaying an image by using the same.

An exemplary embodiment of the present inventive concept provides a display device that may include: a display panel including a first pixel and a second pixel, a processor configured to generate a first image data corresponding to the first pixel, and a first timing control signal, an image corrector configured to shift the first timing control signal to generate a second timing control signal, and to generate a second image data corresponding to the second pixel based on the first image data, wherein the second timing control signal corresponds to a positional relationship between the first pixel and the second pixel; and a data driver configured to generate a data signal based on the second image data and the second timing control signal.

The first timing control signal may include a vertical synchronization signal, a horizontal synchronization signal, and a data enable signal synchronized with the horizontal synchronization signal to define a supply time period of the data signal.

The image corrector may include: a delay module configured to generate the second timing control signal by shifting the first timing control signal; and an image data generator configured to generate the second image data by using a lookup table including the positional relationship between the first pixel and the second pixel.

The delay module may determine a shift time period by using a positional relationship between a first pixel row including the first pixel and a second pixel row including the second pixel.

The shift time period may include a time period of n times of a horizontal period (n is a natural number).

The display device may further include a scan driver configured to generate a scan signal based on the second timing control signal, in which the delay module may determine the shift time period in accordance with a difference in an order, in which the first pixel row and the second pixel row receive the scan signal.

The display device may further include a line memory configured to store the first image data.

The line memory may store the first image data in a unit of a pixel row.

The image data generator may generate the second image data corresponding to the second pixel row based on the first image data corresponding to the first pixel row.

Another exemplary embodiment of the present inventive concept provides a method of displaying an image, the method including: generating a first image data corresponding to a first pixel, and a first timing control signal; generating a second timing control signal by shifting the first timing control signal; generating a second image data corresponding to the second pixel based on the first image data in response to retrieving information regarding a predetermined positional relationship between the first pixel and the second pixel; generating a data signal based on the second image data and the second timing control signal; and making the second pixel emit light with brightness corresponding to the data signal.

The generating of the second image data may include retrieving the information regarding the predetermined positional relationship between the first pixel and the second pixel from a lookup table.

The first timing control signal may include a vertical synchronization signal, a horizontal synchronization signal, and a data enable signal, which is synchronized with the horizontal synchronization signal to define a supply time period of the data signal.

The generating of the second timing control signal may include: determining a shift time period by using the predetermined positional relationship; and generating the second timing control signal by shifting the first timing control signal by the shift time period.

The determining of the shift time period may include determining the shift time period in accordance with a difference in an order, in which a first pixel row including the first pixel and a second pixel row including the second pixel receive a scan signal.

The shift time period may include a time period of n times of a horizontal period (n is a natural number).

The method may further include storing the first image data in a unit of a pixel row.

According to the display device and the method of displaying an image according to the exemplary embodiment of the present inventive concept, it is possible to generate the second image data corresponding to a pixel in advance before the beginning of the frame by shifting the timing control signal by a specific period, so there may be a decrease in memory used for storing the first image data.

Further, according to the display device and the method of displaying an image according to the exemplary embodiment of the present inventive concept, the first image data may be stored in the line memory in the unit of the pixel row, and generate the second image data in the unit of the pixel row, to decrease the usage of the memory.

According to an embodiment of the inventive concept, a display device includes a display panel including a plurality of pixel rows, a processor configured to generate a first image data corresponding to a first pixel row and a first timing control signal, a line memory configured to store the first image data, and an image corrector including a delay module and an image data generator. The delay module generates a second timing control system by shifting a time period of the first timing control signal and pre-stores the first image data in the line memory prior to a beginning of a frame time period for the first image data, and the image data generator is configured to recombine the first image data corresponding to a positional relationship between the first pixel row and a second pixel row, and to generate a second image data corresponding to the second pixel row, and a data driver configured to generate a data signal based on the second image data and the second timing control signal.

The information regarding the positional relationship between the first pixel row and the second pixel row may be stored in a lookup table.

The first timing control signal generated by the processor includes a first vertical synchronization signal, a first horizontal synchronization signal, and a first data enable signal, and n the processor may set the first frame time period of the display panel by output of the first vertical synchronization signal to the image corrector, and the processor may set a horizontal line time period for an initial data signal supplied to the first pixel row by output of the first horizontal synchronization signal to the image corrector.

In an embodiment of the inventive concept, a timing controller receives the second timing control signal from the image corrector and generates a scan control signal and a data control signal.

BRIEF DESCRIPTION OF THE DRAWINGS

Exemplary embodiments of the inventive concept will now be described in more detail hereinafter with reference to the accompanying drawings; however, the inventive concept may be embodied in different forms and should not be construed as limited to the embodiments set forth herein. The embodiments are provided herein for illustrative purposes to a person of ordinary skill in the art.

In the drawing figures, dimensions may be exaggerated for clarity of illustration. It will be understood that when an element is referred to as being "between" two elements, there can also be additional intervening elements present. Like reference numerals refer to like elements throughout.

DETAILED DESCRIPTION

Figure 1:
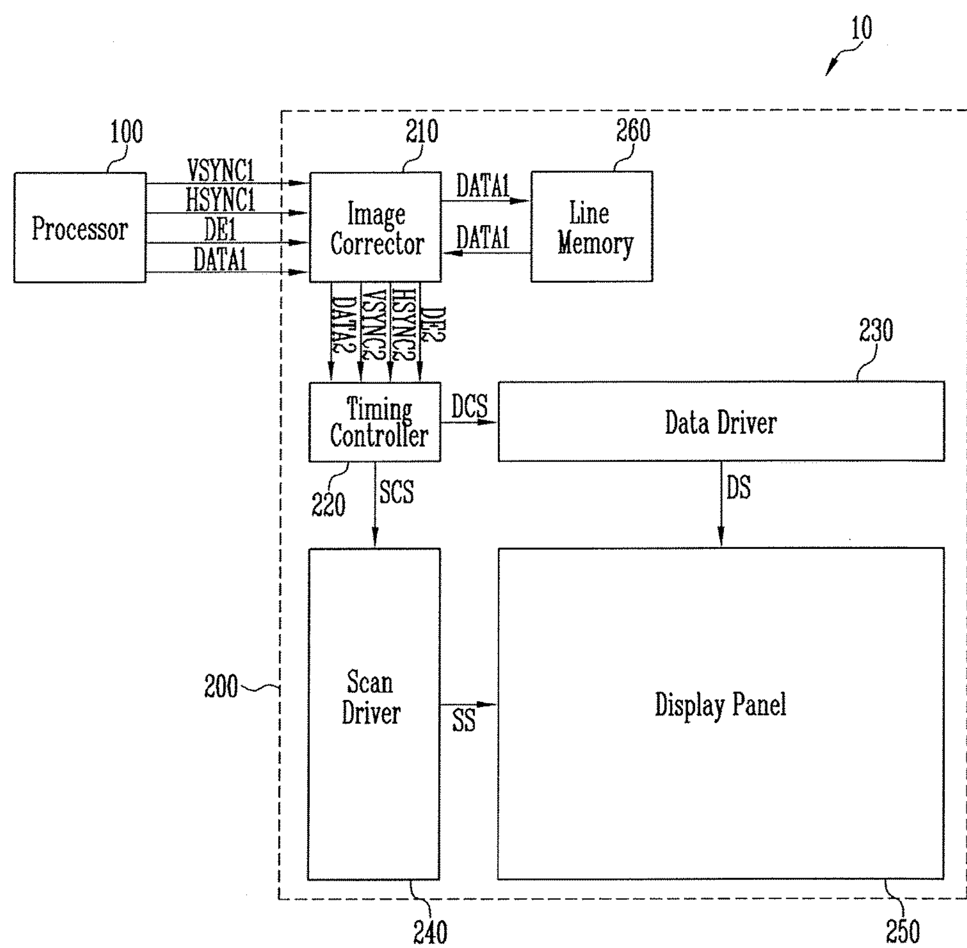
FIG. 1 is a schematic block diagram illustrating a display device according to an exemplary embodiment of the present inventive concept.

In the exemplary embodiments according to the present inventive concept disclosed herein, a specific structural or functional description is illustrative for the purpose of explaining the exemplary embodiments according to the concept of the present disclosure, and the exemplary embodiments may be carried output in various forms. Thus, the present inventive concept is not limited to the exemplary embodiments described in the present specification.

Further, the present inventive concept may be variously modified and have various forms, so that specific exemplary embodiments will be illustrated in the drawings and described in detail in the present specification. However, the present inventive concept includes all of the changes, the equivalent matters, or the replacement matters included in the spirit and the technical scope of the present disclosure.

Terms such as "first", "second", and the like may be used for describing various constituent elements, but the constituent elements should not be limited to the terms. Such terms may be used to discriminate one constituent element from another constituent element. Without departing from the scope inventive concept, a first constituent element may be named as a second constituent element, and similarly a second constituent element may be named as a first constituent element.

As used herein, the singular forms are intended to include the plural forms as well, unless the context clearly indicates otherwise. An artisan should understand that the terms "include" or "have" indicate that a feature, a number, a step, an operation, a component, a part or the combination thereof described in the specification is present, but does not exclude a possibility of presence or addition of one or more other features, numbers, steps, operations, components, parts or combinations thereof, in advance.

Terms used herein, including technological or scientific terms, have the same meaning as those generally understood by a person with ordinary skill in the art. Terms which are defined in a dictionary should be interpreted to have the same meaning as in the context of the related art but are not to be interpreted as an ideally or excessively formal meaning if it is not clearly defined in this specification.

Hereinafter, exemplary embodiments of the present inventive concept will be described in detail with reference to the accompanying drawings.

Figure 2:
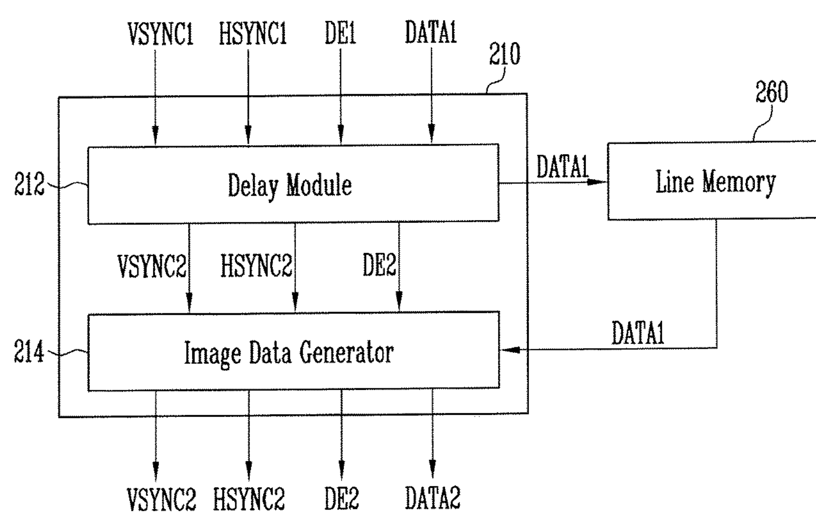
FIG. 2 is a schematic block diagram of an image corrector and a line memory illustrated in FIG. 1.

FIG. 1 is a schematic block diagram illustrating a display device according to an exemplary embodiment of the present disclosure, and FIG. 2 is a schematic block diagram of an image corrector and a line memory illustrated in FIG. 1.

Referring to FIGS. 1 and 2, a display device 10 according to an exemplary embodiment of the present disclosure may include a processor 100 and a display unit 200.

The processor 100 may generate a first image data DATA1, and a first timing control signal for controlling the driving of the display unit 200. The first timing control signal may include, for example, a first vertical synchronization signal VSYNC1, a first horizontal synchronization signal HSYNC1, and a first data enable signal DE1.

Here, the vertical synchronization signal is a signal defining a first frame time period of the display panel 250. For example, a pulse period of the vertical synchronization signal refers to one frame time period, and a frame rate may be calculated by using the one frame time period.

The horizontal synchronization signal is a signal defining one horizontal time period required for writing data in pixels of one row. For example, a pulse period of the horizontal synchronization signal refers to one horizontal time period.

The data enable signal defines a horizontal line section, in which a data signal DS is received from a data driver 230. Accordingly, the data enable signal is provided while being synchronized with the horizontal synchronization signal, so that a pulse period may have one horizontal time period.

The processor 100 may supply (e.g. output) the first image data DATA1, the first vertical synchronization signal VSYNC1, the first horizontal synchronization signal HSYNC1, and the first data enable signal DE1 to the display unit 200.

According to the exemplary embodiment of the inventive concept, the processor 100 which may be implemented by an Application Processor (AP), a mobile AP, a Central Processing Unit (CPU), and/or a Graphic Processing Unit (GPU), executes stored code to control operations of the display unit 200, but embodiments of the inventive concept are not limited to the aforementioned types of processors.

The display unit 200 may include an image corrector 210, a timing controller 220, a data driver 230, a scan driver 240, a display panel 250, and a line memory 260.

The image corrector 210 may generate second image data DATA2 based on the first image data DATA1 so that an image displayed on the display panel 250 is shifted for preventing pixels from deteriorating and possibly forming an afterimage on the display area of the display panel. FIG. 1 illustrates that the image corrector 210 is implemented inside the display unit 200, but according to an exemplary embodiment, the image corrector 210 may be implemented (e.g. integrated) in the processor 100.

The image corrector 210 may include a delay module 212 and an image data generator 214.

The delay module 212 may shift the first timing control signal and generate a second timing control signal.

For example, the delay module 212 may generate a second vertical synchronization signal VSYNC2 by shifting the first vertical synchronization signal VSYNC1 received by the delay module, generate a second horizontal synchronization signal HSYNC2 by shifting the first horizontal synchronization signal HSYNC1 received by the delay module, and generate a second data enable signal DE2 by shifting the first data enable signal DEL This operation will be described in more detail with reference to FIG. 3.

The delay module 212 may store the first image data DATA1 provided from the processor 100 in the line memory 260. In addition, the image data generator 214 may generate the second image data DATA2 based on the first image data DATA1, so that an image displayed by a first pixel is shifted to and displayed by a second pixel. In this case, information regarding a positional relationship between the first pixel and the second pixel may be pre-stored in a lookup table (not shown). The image data generator 214 may read the first image data DATA1 from the line memory 260, and generate the second image data DATA2 by using the lookup table.

The timing controller 220 may receive the second image data DATA2 and the second timing control signal from the image corrector 210.

The timing controller 220 may generate a scan control signal SCS and a data control signal DCS by using the second timing control signal. The scan control signal SCS signal is provided to the scan driver 240, and the data control signal DCS is provided to the data driver 230.

With continued reference to FIGS. 1 and 2, the data driver 230 may generate a data signal DS by using the second image data DATA2 and the data control signal DCS provided from the timing controller 220. The data driver 230 may provide the data signal DS to the pixels through data lines (not shown).

The scan driver 240 may generate a scan signal SS by using the scan control signal SCS. The scan driver 240 may provide the scan signal SS to the pixels through scan lines (not shown).

The display panel 250 may be implemented by an organic light emitting display panel, a liquid crystal display panel, a plasma display panel, and the like, but the inventive concept is not limited to the aforementioned types of display panels.

When the scan signal SS is supplied to the scan lines, each of the pixels in a pixel row selected in a horizontal unit may receive the data signal DS from the data line, and emit light with a predetermined luminance in response to the received data signal DS.

The line memory 260 may store the first image data DATA1 under the control of the delay module 212, and may be implemented by, for example, a Dynamic Random Access Memory (DRAM) or a synchronous DRAM (SDRAM), but the inventive concept is not limited to the aforementioned types of memory.

According to an exemplary embodiment, the delay module 212 may store the first image data DATA1 in the line memory 260 in the unit of the pixel row.

The method of providing, by the image corrector 210, only the second image data DATA2 to the timing controller 220 has been described with reference to FIGS. 1 and 2, but the present disclosure is not limited thereto, and when the image corrector 210 according to the exemplary embodiment of the present disclosure determines the image should not be shifted, the image corrector 210 may supply the first image data DATA1 to the timing controller 220. In this case, the pixels of the display panel 250 may receive the data signal DS generated based on the first image data DATA1.

Figure 3:
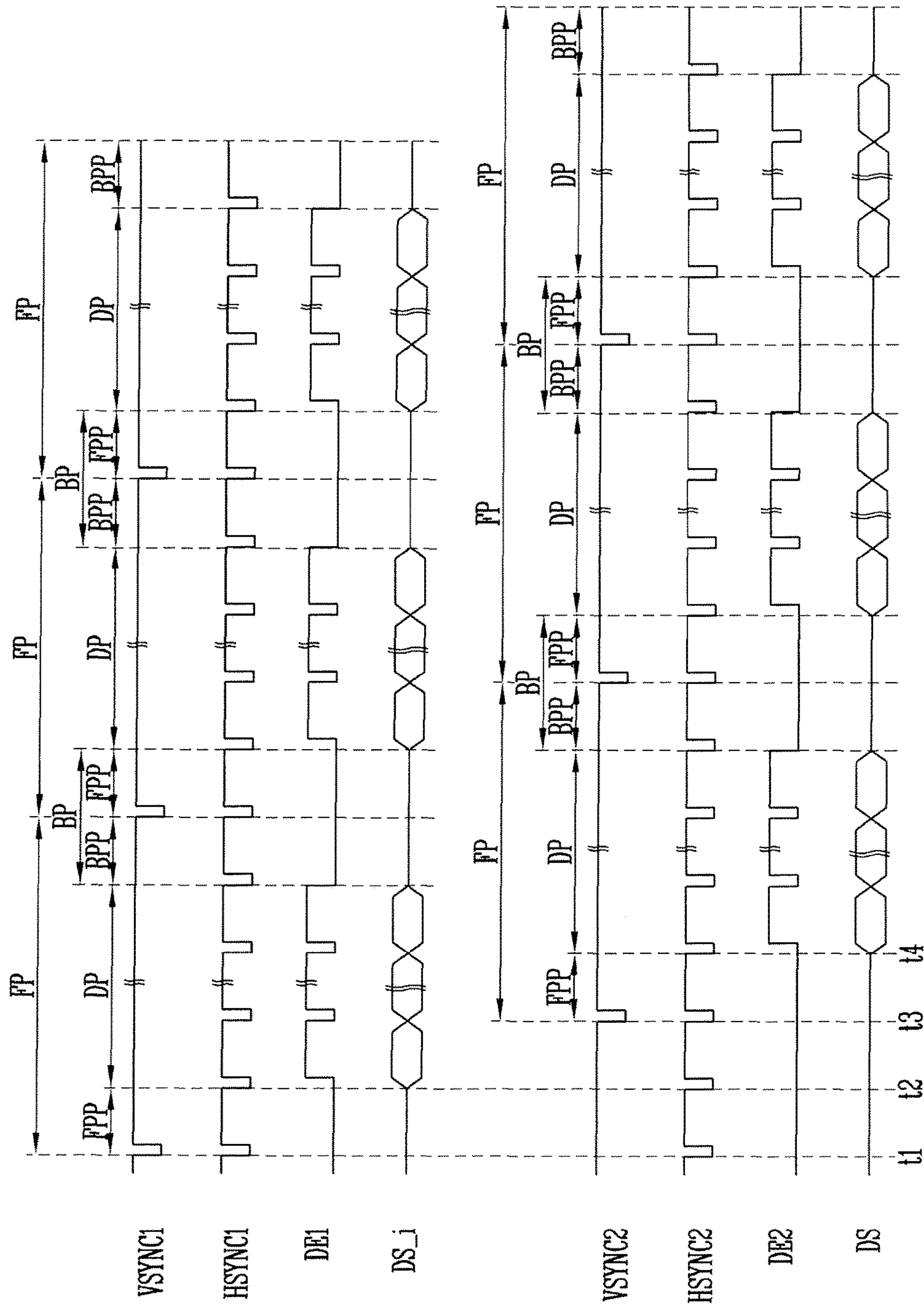
FIG. 3 is a timing diagram illustrating a vertical horizontal signal, a horizontal synchronization signal, a data enable signal, and a data signal illustrated in FIG. 1.

FIG. 3 is a timing diagram illustrating the timing sequence of the vertical horizontal signal, the horizontal synchronization signal, the data enable signal, and the data signal illustrated in FIG. 1.

Referring to FIGS. 1 and 3, a frame period FP includes a data input time period DP, for which the data driver 230 provides the data signal DS to the pixel, and a blank period BP, for which the data driver 230 does not provide the data signal DS to the pixel. Here, the data input time period DP may refer to a time period, for which the pixels display images.

As shown in FIG. 3, the blank period BP includes a front porch period FPP and a back porch period BPP. The front porch period FPP refers to a space between a time point, at which the frame period FP begins, and a time point, at which the data input time period DP begins, and the back porch period BPP refers to a space between a time at which the display period DP is terminated, and a time point at which the frame period FP is terminated.

The first vertical synchronization signal VSYNC1 defines the frame period FP for the first image data DATA1, and represents a frame period of the first image data DATA1. The second vertical synchronization signal VSYNC2 defines the frame period FP for the second image data DATA2, and represents a frame period of the second image data DATA2. The processor sets the frame period for the first image data DATA1 based on the generation of VSYNC1.

With continued reference to FIG. 3, the first horizontal synchronization signal HSYNC1 (as set by the processor) defines a horizontal line time period, for which initial data signal DS_i generated based on the first image data DATA1 is supplied to one pixel row from the data driver 230, and the second horizontal synchronization signal HSYNC2 defines a horizontal line time period, for which the data signal DS generated based on the second image data DATA2 is supplied to one pixel row from the data driver 230.

The first data enable signal DE1 and the second data enable signal DE2 define the data input time period DP and the blank period BP included in the frame section FP, respectively.

The initial data signal DS_i is generated based on the first image data DATA1, and is provided to the display panel 250 for the data input time period DP in response to the first horizontal synchronization signal HSYNC1 and the first data enable signal DE1.

The data signal DS is generated by the data driver 230 based on the second image data DATA2, and is provided to the display panel 250 for the data input time period DP in response to the second horizontal synchronization signal HSYNC2 and the second data enable signal DE2.

The image data generator 214 recombines the first image data DATA1 in response to obtaining information regarding a positional relationship between the first pixel and the second pixel, and generates the second image data DATA2 corresponding to the second pixel. Accordingly, the first image data DATA1 may be pre-stored for the image data generator 214 to generate the second image data DATA2.

In an embodiment of the inventive concept, the delay module 212 may shift an output of the first timing control signal so as to pre-store the first image data DATA1 prior to the beginning of the frame period for the first image data DATA1.

For example, as shown in FIG. 3, when a frame of the first image data DATA1 begins at a first time point t1 and the initial data signal DS_i is supplied to the pixel from a second time point t2, the delay module 212 may shift the first vertical synchronization signal VSYNC1 so that the frame begins at a third time point t3 and the delay module 212 generates the second vertical synchronization signal VSYNC2.

The second horizontal synchronization signal HSYNC2 and the second data enable signal DE2 may be generated by shifting the first horizontal synchronization signal HSYNC1 and the first data enable signal DE1 so that the data signal DS generated based on the second image data DATA2 is provided to the pixel from a fourth time point t4 (FIG. 3).

Here, the shift time periods of the first vertical synchronization signal VSYNC1, the first horizontal synchronization signal HSYNC1, and the first data enable signal DE1 are the same.

According to an exemplary embodiment, the shift time period of each of the first vertical synchronization signal VSYNC1, the first horizontal synchronization signal HSYNC1, and the first data enable signal DE1 may include a time period of n times of a horizontal period (n is a natural number).

For example, the delay module 212 may generate the second vertical synchronization signal VSYNC2, the second horizontal synchronization signal HSYNC2, and the second data enable signal DE2 by shifting the first vertical synchronization signal VSYNC1, the first horizontal synchronization signal HSYNC1, and the first data enable signal DE1 by the time period of two times of the horizontal period, respectively.

The delay module 212 may determine the shift time period according to a positional relationship between the first pixel and the second pixel. Here, the first pixel is a pixel receiving the initial data signal DS_i generated based on the first image data DATA1, and the second pixel is a pixel receiving the data signal DS generated based on the second image data DATA2.

For example, the delay module 212 may determine the shift time period by referring to the positional relationship between the first pixel and the second pixel stored in a lookup table.

According to the exemplary embodiment, the delay module 212 may determine the shift time period by using a positional relationship between a first pixel row that includes the first pixel and a second pixel row that includes the second pixel.

For example, the delay module 212 may determine the shift time period in response to an interval between the first pixel row and the second pixel row in a vertical direction. Here, the vertical direction may refer to a direction vertical to the scan lines disposed on the display panel 250. The method of determining the shift time period by the delay module 212 utilizes information regarding the positional relationship between the first pixel row and the second pixel row will be described in more detail with reference to FIG. 8.

Figure 4:
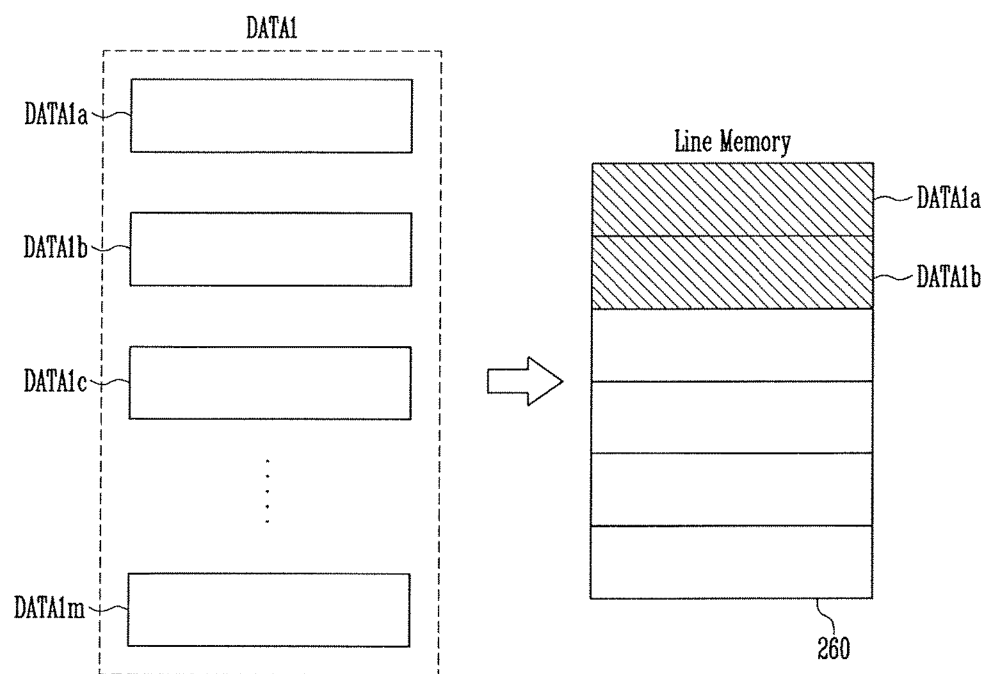
FIG. 4 is a conceptual diagram illustrating the line memory storing first image data according to an exemplary embodiment of the present inventive concept.

FIG. 4 is a conceptual diagram illustrating the line memory storing first image data according to an exemplary embodiment of the present inventive concept.

Referring to FIG. 4, the delay module 212 may store the first image data DATA1 provided from the processor 100 in the line memory 260 in the unit of a pixel row (e.g. in pixel row units).

For example, when m pixel rows are present in the display panel 250, the delay module 212 may sequentially store a first image data DATA1*a* to DATA1*m* in corresponding first to $m^{th}$ pixel rows in the line memory 260.

The delay module 212 according to the exemplary embodiment of the present disclosure may store only the first image data DATA1 in pixel row units to generate the second image data DATA2 corresponding to one pixel row.

For example, when the first image data DATA1*a* of the first pixel row and the first image data DATA1*b* of the second pixel row among the total of m pixel rows of the display panel 250 are used to generate the second image data DATA2 corresponding to a second pixel row, the delay module 212 may store only the first image data DATA1*a* of the first pixel row and the first image data DATA1*b* of the second pixel row in the line memory 260. An artisan should understand and appreciate that the inventive concept is not limited to the aforementioned operation of the delay module storage.

Further, the image data generator 214 may read the first image data DATA1*a* of the first pixel row and the first image data DATA1*b* of the second pixel row from the line memory 260 and generate the second image data DATA2.

As described above, the delay module 212 according to the exemplary embodiment of the present disclosure may store the minimum first image data DATA1 required for generating the second image data DATA2 and decrease usage of the memory.

Further, the delay module 212 receives the first image data DATA1 from the processor 100 regardless of whether the first timing control signal is to be shifted, so that the delay module 212 may sequentially store the received first image data DATA1 in the line memory 260.

With reference to FIG. 2, the image data generator 214 may read the first image data DATA1 stored in the line memory 260 for the shift time period, and generate the second image data DATA2 corresponding to the second timing control signal. As described above, the image data generator 214 may generate the second image data before the beginning of the frame. In such a case, memory usage for storing the first image data DATA1 is minimized.

Figure 5:
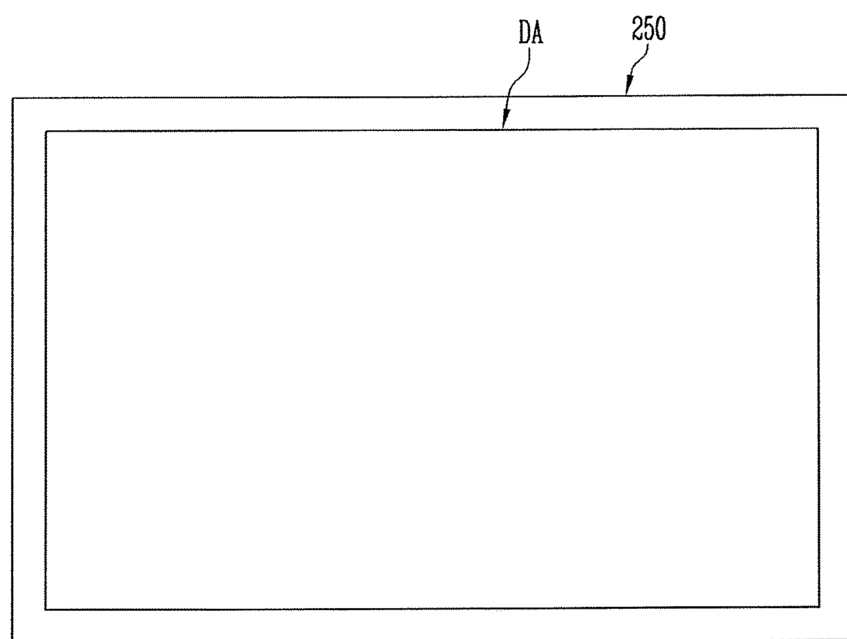
FIG. 5 is a conceptual diagram illustrating an image display area of a display panel according to an exemplary embodiment of the present inventive concept.
Figure 6:
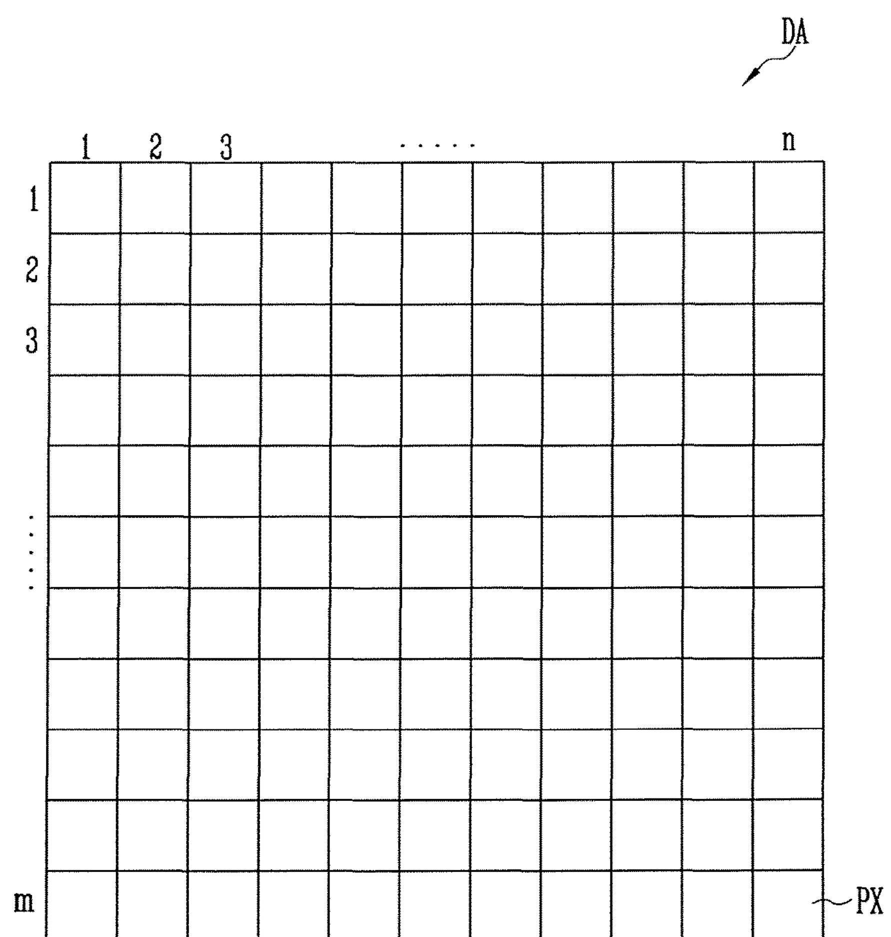
FIG. 6 is a conceptual diagram illustrating pixels disposed in the image display area illustrated in FIG. 5.

FIG. 5 is a conceptual diagram illustrating an image display area of the display panel according to the exemplary embodiment of the present inventive concept, and FIG. 6 is a conceptual diagram illustrating the pixels disposed in the image display area illustrated in FIG. 5.

Referring to FIG. 5, the display panel 250 may include an image display area DA, which is capable of displaying an image. A user of the display panel 250 may view an image displayed on the image display area DA.

The image display area DA may include a plurality of pixels PX which emits light with brightness corresponding to the data signal DS.

Referring to FIG. 6, the image display area DA may include the pixels PX arranged in an m×n matrix structure. For example, when resolution of the display panel 250 is 1920×1080, n may be 1,920, and m may be 1,080.

The data signal DS, which is generated based on the second image data DATA2, may be supplied to the second pixel to enable the second pixel to emit light with predetermined brightness.

According to an exemplary embodiment of the inventive concept, the first pixel corresponding to the first image data DATA1 and the second pixel corresponding to the second image data DATA2 may be the same pixel, or may be different pixels which are disposed while being spaced apart from each other. The positional relationship information in the lookup table would indicate the position of the first pixel and second pixel, which may be in different pixel rows.

Figure 7:
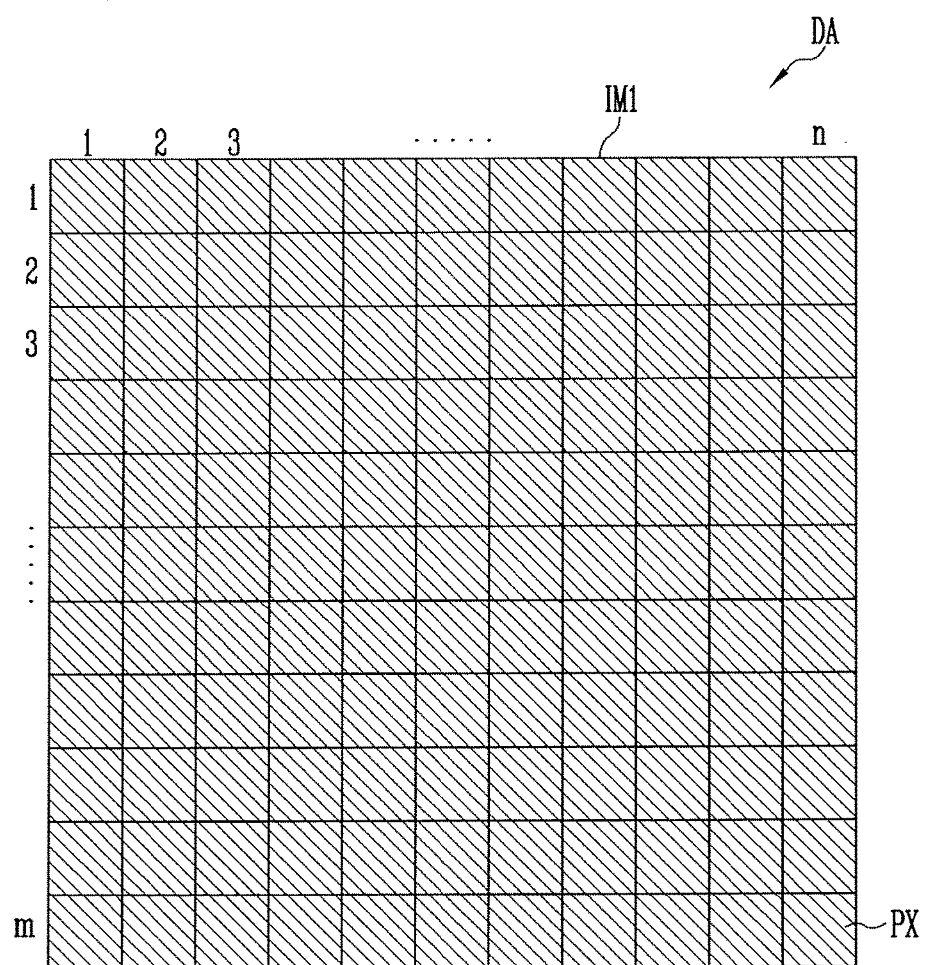
FIG. 7 is a conceptual diagram illustrating an initial image displayed in the image display area according to the exemplary embodiment of the present inventive concept.
Figure 8:
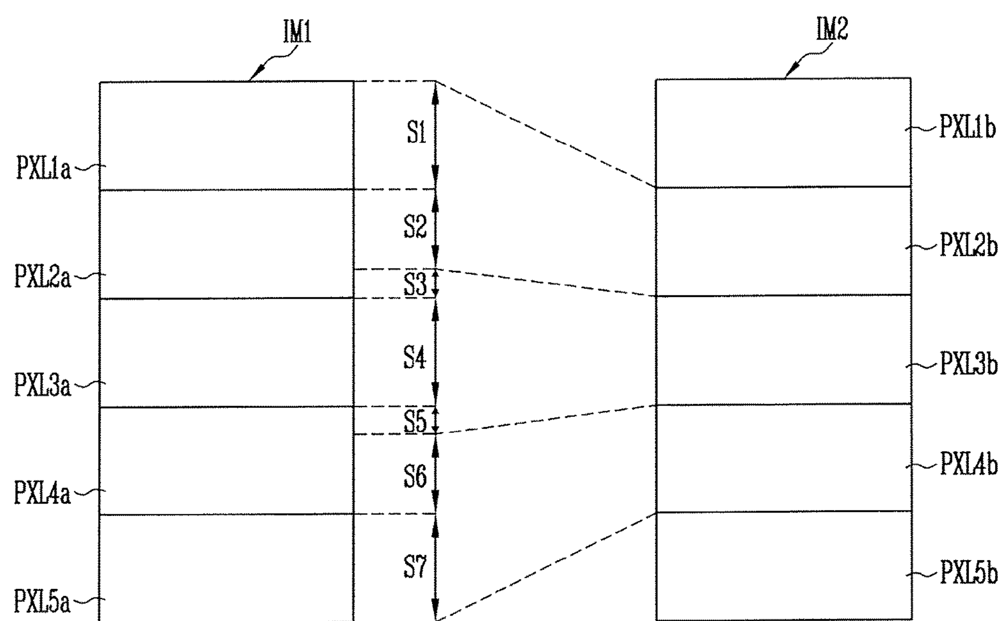
FIG. 8 is a conceptual diagram illustrating an initial image and a corrected image according to the exemplary embodiment of the present inventive concept.

FIG. 7 is a conceptual diagram illustrating an initial image displayed in the image display area according to the exemplary embodiment of the present inventive concept, and FIG. 8 is a conceptual diagram illustrating an initial image and a corrected image according to the exemplary embodiment of the present inventive concept.

Referring to FIG. 7, to compare an initial image IM1 and a corrected image IM2, the initial image IM1 displayed on the entire image display area DA is illustrated.

The initial image IM1 refers to an image displayed according to the supply of the initial data signal DS_i generated based on the first image data DATA1 to the pixels PX, and the corrected image IM2 refers to an image displayed according to the supply of the data signal DS generated based on the second image data DATA2 to the pixels PX.

When the image corrector 210 does not generate the second image data DATA2 based on the first image data DATA1, but supplies the first image data DATA1 to the timing controller 220, the timing controller 220 may provide the first image data DATA1 to the data driver 230 and display the initial image IM1 on the image display area DA of the display panel 250.

Referring to FIG. 8, for convenience of description, there is shown the initial image IM1 displayed by the first to fifth pixel rows PXL1*a* to PXL5*a*, and the corrected image IM2 displayed by the first to fifth pixel rows PXL1*b* to PXL5*b*.

The initial image IM1 displayed by the first to fifth pixel rows PXL1*a* to PXL5*a* may be reduced in accordance with predetermined reduction ratios S1 to S7, and may be displayed as the corrected image IM2 displayed by the second to fourth pixel rows PXL2*b* to PXL4*b*.

For example, each of the initial image IM1 displayed by the first pixel row PXL1*a* and the initial image IM1 displayed by the second pixel row PXL2*a* may be reduced in accordance with a first reduction ratio S1 and a second reduction ratio S2 and may be corrected to the corrected image IM2 displayed by the second pixel row PXL2*b*.

In addition, each of the initial image IM1 displayed by the second pixel row PXL2*a*, the initial image IM1 displayed by the third pixel row PXL3*a*, and the initial image IM1 displayed by the fourth pixel row PXL4*a* may be reduced in accordance with the third reduction ratio S3, a fourth reduction ratio S4, and a fifth reduction ratio S5 and may be corrected to the corrected image IM2 displayed by the third pixel row PXL3*b*.

Furthermore, each of the initial image IM1 displayed by the fourth pixel row PXL4*a* and the initial image IM1 displayed by the fifth pixel row PXL5*a* may be reduced in accordance with a sixth reduction ratio S6 and a seventh reduction ratio S7 and may be corrected to the corrected image IM2 displayed by the fourth pixel row PXL4*b*. The display of the corrected image IM2 (in a reduced size when compared with the initial image IM1) can result in the pixels having a different brightness as compared to when the initial image IM1 is displayed, which can reduce or eliminate pixel degradation.

With continued reference to FIG. 8, the corrected image IM2 displayed by the first pixel row PXL1*b* and the corrected image IM2 displayed by the fifth pixel row PXL5*b* may be black areas, in which the image is not displayed.

The image data generator 214 may generate the second image data DATA2 based on the first image data DATA1 so that the initial images IM1 displayed by the first to fifth pixel rows PXL1*a* to PXL5*a* are displayed as the corrected images IM2 displayed by the second to fourth pixel rows PXL2*b* to PXL4*b*.

For example, the image data generator 214 may read the first image data DATA1 corresponding to the first pixel row PXL1*a* and the first image data DATA1 corresponding to the second pixel row PXL2*a* from the line memory 260, and generate the second image data DATA2 corresponding to the second pixel row PXL2*b*. In this example, the line memory 260 stores the image data DATA1 corresponding to the first pixel row PXL1*a* and the first image data DATA1 corresponding to the second pixel row PXL2*a*.

In another example, the image data generator 214 may read the first image data DATA1 corresponding to the second pixel row PXL2*a*, the first image data DATA1 corresponding to the third pixel row PXL3*a*, and the first image data DATA1 corresponding to the fourth pixel row PXL4*a* from the line memory 260, and generate the second image data DATA2 corresponding to the third pixel row PXL3*b*. In this case, the line memory 260 may delete the first image data DATA1 corresponding to the first pixel row PXL1*a*, and may store the first image data DATA1 corresponding to the second pixel row PXL2*a*, the first image data DATA1 corresponding to the third pixel row PXL3*a*, and the first image data DATA1 corresponding to the fourth pixel row PXL4*a*.

As described above, the line memory 260 may minimize the usage of the memory by using a minimum space to generate the second image data DATA2.

In addition, the delay module 212 may determine the shift time period based on a positional relationship between an initial pixel row displaying the corrected image IM2 and a pixel row displaying an initial image IM1 corresponding to the corrected image IM2.

For example, the initial pixel row displaying the corrected image IM2 is the second pixel row PXL2*b*, and the initial pixel rows displaying the initial images IM1 corresponding to the corrected image IM2 may be the first and second pixel rows PXL1*a* and PXL2*a*. Accordingly, the delay module 212 may determine that the first image data DATA1 corresponding to the first and second pixel rows PXL1*a* and PXL2*a* is required, and determine the shift time period corresponding to two times of the horizontal period.

The delay module 212, for example, may shift the first timing control signal by two times of the horizontal period and generate a second timing control signal. The corrected image IM2 displayed by the second pixel row PXL2*b* may be displayed under the control of the second timing control signal.

Figure 9:
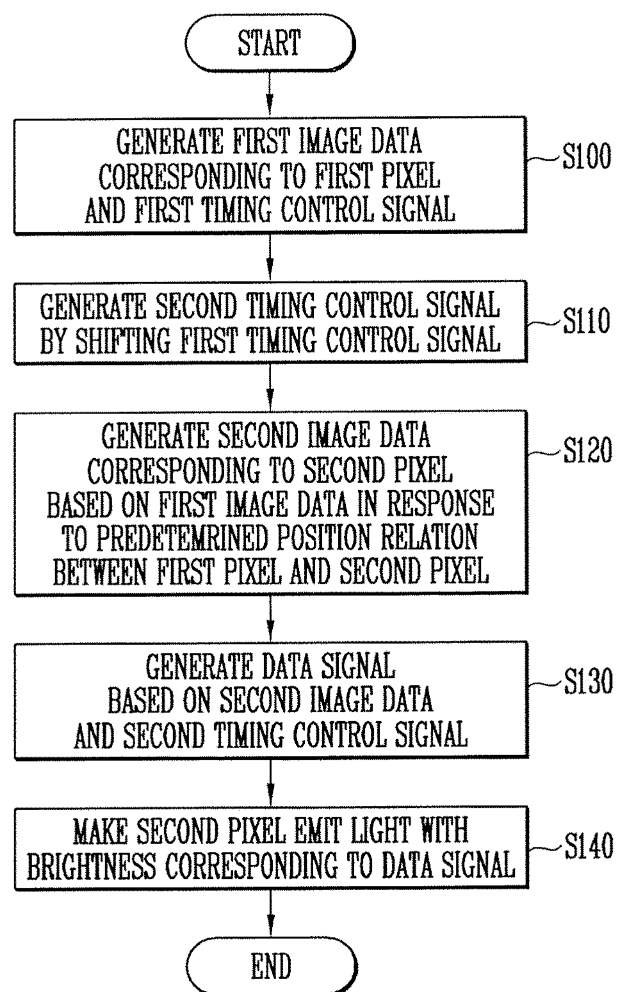
FIG. 9 is a flowchart illustrating a method of displaying an image according to an exemplary embodiment of the present inventive concept.

FIG. 9 is a flowchart for illustrating a method of displaying an image according to an exemplary embodiment of the present inventive concept.

Referring to FIG. 9, the display device 10 according to the exemplary embodiment of the present inventive concept may generate first image data DATA1 corresponding to a first pixel and a first timing control signal (S100).

The display device 10 may generate a second timing control signal by shifting the first timing control signal (S110).

The display device 10 may generate second image data DATA2 corresponding to a second pixel based on the first image data DATA1 in response to a predetermined positional relationship between the first pixel and the second pixel (S120).

The display device 10 may generate a data signal DS based on the second image data DATA2 and the second timing control signal (S130).

The display device 10 may enable the second pixel to emit light with brightness corresponding to the data signal DS (S140).

The present inventive concept has been described with reference to the exemplary embodiment illustrated in the drawings, but the exemplary embodiment is only illustrative, and it should be appreciated by those skilled in the art that various modifications and equivalent exemplary embodiments may be made.

What is claimed is:

1. A display device, comprising:
- a display panel including a first pixel and a second pixel;
- a processor configured to generate a first image data corresponding to the first pixel, and a first timing control signal;
- an image corrector configured to shift the first timing control signal to generate a second timing control signal, and to generate a second image data corresponding to the second pixel based on the first image data, wherein the second timing control signal corresponds to a positional relationship between the first pixel and the second pixel; and
- a data driver configured to generate a data signal for an image, the image shifted in position from the first pixel to the second pixel on the display panel based on the second image data and the second timing control signal.

2. The display device of claim 1, wherein the first timing control signal includes a vertical synchronization signal, a horizontal synchronization signal, and a data enable signal synchronized with the horizontal synchronization signal to define a supply time period of the data signal.

3. The display device of claim 1, wherein the image corrector includes:
- a delay module configured to generate the second timing control signal by introducing a time delay to shift the first timing control signal; and
- an image data generator configured to generate the second image data based on information stored in a lookup table regarding at least the positional relationship between the first pixel and the second pixel.

4. The display device of claim 3, wherein
- the lookup table further includes information regarding a positional relationship between a first pixel row including the first pixel and a second pixel row including the second pixel; and
- the delay module determines a shift time period based on the positional relationship of the first pixel row and the second pixel row.

5. The display device of claim 4, wherein the shift time period includes a time period of n times of a horizontal period (n is a natural number).

6. The display device of claim 4, further comprising:
- a scan driver configured to generate a scan signal supplied to the first pixel row and the second pixel row based on the second timing control signal, wherein the delay module determines the shift time period in accordance with a difference in an order in which the first pixel row and the second pixel row receive the scan signal.

7. The display device of claim 4, further comprising:
- a line memory connected to the delay module and the image data generator, wherein the line memory is configured to store the first image data.

8. The display device of claim 7, wherein the line memory is configured to store the first image data in a unit comprised of a pixel row.

9. The display device of claim 8, wherein the image data generator generates the second image data corresponding to the second pixel row based on the first image data corresponding to the first pixel row.

10. A method of displaying an image, comprising:
- generating a first image data corresponding to a first pixel, and a first timing control signal;
- generating a second timing control signal by shifting the first timing control signal, the second timing control signal corresponding to a predetermined positional relationship between the first pixel and a second pixel;
- generating a second image data corresponding to the second pixel based on the first image data;
- generating a data signal for an image, the image shifted in position from the first pixel to the second pixel on a display panel based on the second image data and the second timing control signal; and
- driving the second pixel to emit light with a brightness corresponding to the data signal.

11. The method of claim 10, wherein the generating the second image data includes retrieving the information regarding the predetermined positional relationship between the first pixel and the second pixel from a lookup table.

12. The method of claim 10, wherein the first timing control signal includes a vertical synchronization signal, a horizontal synchronization signal, and a data enable signal synchronized with the horizontal synchronization signal to define a supply time period of the data signal.

13. The method of claim 10, wherein the generating of the second timing control signal includes:

determining a shift time period based on the positional relationship between the first pixel and the second pixel; and generating the second timing control signal by shifting the first timing control signal by the shift time period.

14. The method of claim 13, wherein the determining of the shift time period further includes determining an order in which a first pixel row including the first pixel and a second pixel row including the second pixel receive a scan signal.

15. The method of claim 13, wherein the shift time period includes a time period of n times of a horizontal period (n is a natural number).

16. The method of claim 10, further comprising:

storing the first image data in a unit comprised of a pixel row.

17. A display device, comprising:

a display panel including a plurality of pixel rows;

a processor configured to generate a first image data corresponding to a first pixel row and a first timing control signal;

a line memory configured to store the first image data;

an image corrector including:

a delay module that generates a second timing control signal by shifting a time period of the first timing control signal and pre-stores the first image data in the line memory prior to a beginning of a frame time period for the first image data, and an image data generator configured to recombine the first image data corresponding to a positional relationship between the first pixel row and a second pixel row, and to generate a second image data corresponding to the second pixel row; and a data driver configured to generate a data signal for an image, the image shifted in position from the first pixel row to the second pixel row on the display panel based on the second image data and the second timing control signal.

18. The display device of claim 17, further comprising a lookup table wherein information regarding the positional relationship between the first pixel row and the second pixel row is stored.

19. The display device according to claim 17, wherein the first timing control signal generated by the processor includes a first vertical synchronization signal, a first horizontal synchronization signal, and a first data enable signal, wherein the processor is configured to set the first frame time period of the display panel by output of the first vertical synchronization signal to the image corrector, and the processor sets a horizontal line time period for an initial data signal supplied to the first pixel row by output of the first horizontal synchronization signal to the image corrector.

20. The display device according to claim 17, further comprising a timing controller that receives the second timing control signal from the image corrector and generates a scan control signal and a data control signal.

* * * * *